May 17, 1966    L. A. MEDLAR ETAL    3,252,070
BATTERY CHARGE MAINTAINERS
Filed July 31, 1962    2 Sheets-Sheet 1

INVENTORS
LEWIS A. MEDLAR
JAMES B GODSHALK
BY
Arnold and Roylance

United States Patent Office 3,252,070
Patented May 17, 1966

3,252,070
BATTERY CHARGE MAINTAINERS
Lewis A. Medlar, Lansdale, and James B. Godshalk, West Pikeland Township, Pa., assignors to Fox Products Company, Philadelphia, Pa., a corporation of Pennsylvania
Filed July 31, 1962, Ser. No. 213,650
10 Claims. (Cl. 320—21)

This application is a continuation-in-part of copending application Serial No. 718,284, now abandoned, filed February 28, 1958.

This invention relates to battery chargers and particularly to an improved apparatus and method for maintaining storage batteries at a predetermined state of charge.

In the past, storage batteries were usually maintained at the desired level of charge when idle, as in storage in warehouses or in retail establishments awaiting sale, by constantly slow charging with a trickle charger. It has recently been discovered that the continuous charge supplied to a battery for a prolonged period by a conventional low rate or trickle charger frequently damages the battery, and also is often not adequately effective to maintain the battery at the desired level of charge. It has also been discovered that these disadvantages can be overcome by using a method which has now become known in the art as "pulse charging." In accordance with this method, the charging current is supplied to the battery in the form of periodic pulses, with the battery being idle between pulses. As disclosed in Patent No. 2,977,525, issued March 28, 1961, to Lewis A. Medlar, it has been proposed to carry out pulse charging by means of cyclic switching devices.

The present invention provides a battery charge maintainer capable of carrying out pulse charging without requiring a time clock driven switching means, or other equivalent mechanical device and therefore has the advantages of greater simplicity and lower cost. The invention is further characterized by the provision of a novel circuit arrangement such that the duration of the charging pulses, and of the idle periods therebetween, can be selectively adjusted.

In order that the invention can be understood in detail, reference is had to the accompanying drawings which form a part of this specification, and wherein.

Figure 1:
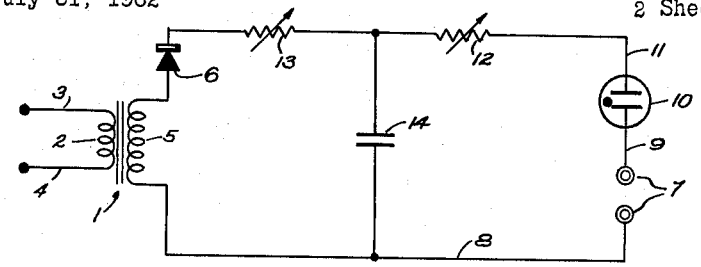
FIG. 1 is a circuit diagram illustrating one embodiment of the invention.

Referring now to the drawings in detail, and first to FIG. 1, it will be seen that this embodiment of the invention includes a D.C. supply circuit comprising a transformer 1 having a primary winding 2 provided with leads 3, 4 for connection to an A.C. source. A first terminal of secondary winding 5 of the transformer is connected to a half-wave rectifier 6.

The battery charging circuit employed comprises a pair of conventional ring-type connectors 7 to be applied to the terminals of the battery, or to the end terminals of a series of batteries, to be charged. Any suitable type of connector means may be employed, and the batteries may be connected in the charging circuit in parallel when more than one battery is to be charged.

One connector 7 is connected by conductor 8 to the second terminal of secondary winding 5 of the transformer. The other connector 7 is connected via 9 to one element of a gas-filled breakdown device 10, which may advantageously be a neon glow tube. The remaining element of discharge device 10 is connected by conductor 11 to the series combination of two resistance means 12 and 13, thence to the rectifier 6. A condenser 14 is connected across the series combination of connectors 7, discharge device 10 and resistance means 12.

The combination of resistance means 12, 13, condenser 14 and gas-filled discharge device 10 constitutes a relaxation oscillator operable to pass charging current to the battery periodically, thus accomplishing pulse charging. Gas-filled discharge device 10 has a predetermined breakdown voltage, that is, it will not pass current until the voltage across its terminals reaches a predetermined value. Considering condenser 14 to be initially discharged, current flows through resistance means 13, for a period determined by the RC constant of the circuit constituted by resistance means 13 and condenser 14, until the resulting charge on condenser 14 equals the battery voltage plus the breakdown voltage of the discharge device, at which point the condenser discharges through discharge device 10 and current is supplied to the battery or batteries connected to connectors 7.

Gas-filled discharge device 10 again becomes non-conductive only when the voltage thereacross reaches a predetermined value which is substantially lower than the breakdown voltage. The time required for condenser 14 to discharge to this extent, and thus the duration of the charging pulse supplied to the battery or batteries, is determined by the RC constant of the circuit constituted by condenser 14, resistance means 12, discharge device 10 and the batteries. When the condenser is discharged to an extent such that discharge device 10 becomes non-conductive, the same cycle of operation just described again commences, and pulse charging is thus carried out so long as A.C. is supplied to the transformer.

In order that the time period required for charging condenser 14 until the breakdown voltage of discharge device 10 is obtained can be selected, resistance means 13 advantageously comprises an adjustable resistance such as a conventional rheostat.

In some applications, resistance means 12 can be omitted, the time for discharging condenser 14 then being relatively short because of the relatively low resistance of the circuit involved. In order that this time period can be made longer, to equal one of a number of desired periods, resistance means 12 also advantageously comprises an adjustable resistance, such as a conventional rheostat.

Resistance means 12 and 13 must be properly adjusted in order to attain proper charge maintenance with a minimum of damage to the battery. Although the exact underlying phenomena are not known, it has been determined by laboratory tests that the rate of grid corrosion, which is the type of damage caused by steady trickle charging, is a function of the battery terminal voltage. Apparently, the corrosion rate is high when the terminal voltage is substantially below the full charge terminal voltage. As the terminal voltage increases, the corrosion rate decreases reaching a minimum rate of corrosion at a terminal voltage slightly above the full charge open circuit terminal voltage. As the terminal voltage increases further, the corrosion rate begins increasing very rapidly, and at a voltage only slightly higher than that at which minimum corrosion occurs, there is an extremely high corrosion rate.

For the ordinary 6-volt automative battery, an average charging current of approximately 0.1 amp is sufficient to compensate for self-discharge of the battery. The charging current is determined primarily by the difference between the no-load terminal voltage of the battery and the applied charging potential. In order to obtain 0.1 amp charging current, the charging potential selected is usually on the order of a few tenths of a volt above the no-load battery terminal voltage. Changes in surrounding conditions, such as changes in ambient temperature, only affect the charging potential a small amount, but this small amount is magnified in effect since it drastically changes the difference between charging potential and no-load battery terminal potential, thus causing a considerable variation in charging current. In order to insure that there is sufficient charging current at all times, it is necessary to use a charging potential higher than would otherwise be necessary, which means that operation very often takes place at voltages corresponding to extremely high battery grid corrosion rates. It should be noted that with the circuit in accordance with this invention, the affect of the changes in charging potential are much less pronounced. The primary control over charging current is attained by controlling the charging duty cycle, i.e., by controlling the ratio of charging time to time during which no charging takes place. Since the duty cycle is a ratio, and since the time elements making up the ratio would be equally affected by changes in environment, there is little change in the duty cycle during operation. Furthermore, changes in duty cycle do not have a magnified effect on charging current, and as the duty cycle is decreased the effect of changes in charging potential decrease proportionately. Thus, the charge maintained, in accordance with this invention, can maintain the average charging current sufficiently low that the charging takes place causing minimum corrosion.

The more accurate control of charging current does not completely explain the benefit of the charger circuit illustrated in FIG. 1. Laboratory life study tests have been conducted on batteries where in each case the batteries were charged at a rate of 3.6 ampere hours per day; this charge rate being in excess of the 2 ampere hours per day required to maintain the charge. Where the duty cycle was continuous, as is the case with the normal trickle chargers, the battery grids corroded rapidly. Where the duty cycle was reduced so that charging took place 1 part in 10, there was no substantial grid corrosion. Satisfactory operation was also achieved by further reducing the duty cycle to as low as 1 part in 600. These phenomena are not well understood, but it is assumed that the terminal voltage does not have time to build up to a value where high corrosion rates occur and that during the substantial time during which no charging takes place, the terminal voltage decays to a level where corrosion is very low.

Thus, it is evident that resistance means 12 and 13 must be so adjusted that there is a charging duty cycle preferably less than 1 part in 10 so as to reduce the effect of changes in charging potential, and to insure that operation is in the range where little grid corrosion occurs even when the charging current is higher than required. In other words, resistance means 12 and 13 are preferably adjusted so that the charging time of capacitor 14 is ten times as long as the discharge time through the battery being charged. Also, it is preferable that the charging time of capacitor 14 be relatively long, which, as explained previously, can be in the order of 5 to 10 minutes. Furthermore, the duty cycle for a particular charger should be adjusted so that the charging current measured in ampere hours per day is of the minimum value required to maintain the connected batteries at full charge. For 6-volt automotive batteries, the charging current should be approximately 2 ampere hours per day, and for 12-volt automotive batteries the charging current should be approximately 1.2 ampere hours per day.

Accordingly, if the duty cycle is properly adjusted with the charging time being short compared to the time during which charging does not take place, the grid corrosion and the effect of environment changes can be minimized.

It will be noted that, in the apparatus of FIG. 1, the charging current is supplied to the battery or batteries via the glow discharge tube. Accordingly, the apparatus of FIG. 1 is limited, as to the magnitude of the charging current, by the current capacity of the discharge tube. Further, when the glow discharge tube carries a substantial charging current, the life of the tube may be relatively shorter than is commercially desirable. Accordingly, in some commercial applications, it is advantageous to employ a circuit of the type illustrated in FIG. 2, wherein the relaxation oscillator does not itself carry the charging current but is rather employed to control an electrical relay device such as a grid-controlled discharge tube.

This embodiment of the invention comprises a transformer 1 having a primary winding 2 provided with leads 3, 4 for connection to an A.C. source, and a secondary winding 5 with leads 15–18 connected to various points of potential on the secondary winding 5, for connection to other components in the circuit.

As explained when referring to FIG. 1, the battery charging circuit utilizes a pair of conventional ring type connectors 7 to be connected to the battery or batteries to be charged. One connector 7 is connected by conductor 19 to one terminal of an adjustable series resistance 20, the other terminal of which is connected to lead 15 of the transformer secondary 5. The other connector 7 is connected via conductor 21 to the anode 22 of a grid-controlled discharge device 23, which can advantageously be a thyratron tube. The cathode 24 of discharge device 23 is connected via resistor 25 to ground.

A condenser 26 is connected in parallel with resistor 25. Lead 18 from secondary 5 is connected to one terminal of unidirectional current element 27. The other terminal of unidirectional element 27 is connected to the cathode 24 of discharge device 23. The unidirectional current element 27 is connected so the direction of current flow therethrough is from the side thereof connected to lead 18.

Lead 16 of secondary 5 is connected via unidirectional current device 6 to one terminal of adjustable series resistance 13, the other terminal of which is connected to one element of a gas-filled discharge device 10, which can advantageously be a neon glow tube. The remaining element of discharge device 10 is connected to grid 28 of discharge device 23 via grid current limiting resistance 29 and also to ground via adjustable resistance 12. Condenser 14 is connected in parallel with the series combination of the discharge device 10 and the resistance 12.

Lead 17 of secondary winding 5 is connected to ground to provide the point of ground potential for the secondary winding 5.

The combination of resistance means 12, 13, condenser 14 and gas-filled discharge device 10 form the basic relaxation oscillator, the operation of which was explained when referring to hte embodiment of FIG. 1. Its operation is identical with the embodiment of FIG. 1 except that the batteries to be maintained are not directly connected to this part of the circuit. Resistance means 12 and 13 are adjustable, as in the first embodiment, to provide a means for controlling the duration of the nonconductive and conductive periods for the discharge device 10.

One means for providing a negative bias for the grid 28 of discharge device 23, which is necessary to prevent the discharge device from conducting, is provided by the rectifier circuit comprising the unidirectional current element 27, condenser 26 and resistance 25. When the discharge device 10 is not conducting, no potential exists across the resistance 12, and the bias for grid 28 is that potential appearing across resistance 25. When discharge device 10 is conducting, a positive potential exists across resistance 12 which reduces the negative bias of the grid 28 sufficiently to cause discharge device 23 to conduct if a sufficiently large potential also exists at the anode 22. The discharge device 23 continues to conduct until the potential of anode 22 is reduced sufficiently to make device 23 non-conductive. During the negative half of the alternating current, the thyratron, of course, will not conduct. At some point during the next positive half cycle, the thyratron will again conduct if the current through discharge device 10 has remained sufficiently large to provide the proper bias an the grid 28. Whether the current through the discharge device 10 has remained large enough is dependent on the length of the conducting period of the discharge device 10, which, as mentioned previously, can be predetermined. After the discharge device 10 has stopped conducting, or the current flow through it has reduced sufficiently, the negative bias regains control of the thyratron 23, after the thyratron has ceased to conduct due to reduction in the potential at the anode 22. The thyratron 23 does not conduct again until the voltage across condenser 14 reaches the value sufficient to cause the discharge device 10 to conduct, resulting in an increase in the bias of grid 28.

Figure 3:
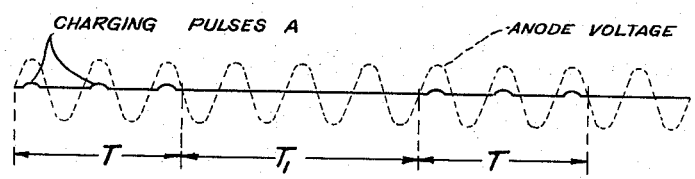
FIG. 3 is a graphical illustration of one type of charging current obtainable with the apparatus of FIG. 2.

Assuming that, by adjustment of resistance 12, the period of conduction of discharge device 10 has been made equal to several cycles of the alternating current, the charging current supplied to the battery or batteries will be of the nature seen in FIG. 3. Thus, short pulses A will be supplied over a period T, no charging will occur during a period $T_1$, and the series of short pulses will again be applied over period T. Duration of period T is predetermined by adjustment of resistance 12, which duration of period $T_1$ is predetermined by adjustment of resistance 13. The period $T_1$ is sufficiently long that the total no-charge time, i.e., the time interval between A pulse plus the time period $T_1$, is long compared to the total time duration of a group of A pulses. Preferably, the periods T and $T_1$ are so adjusted that the charging duty cycle is preferably less than one part in 10.

Figure 2:
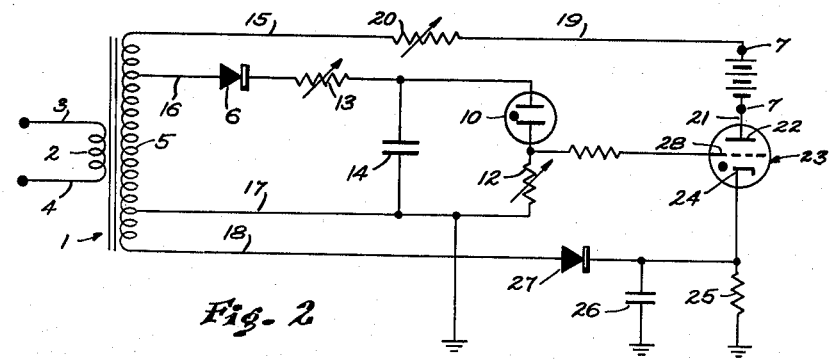
FIG. 2 is a circuit diagram illustrating a second embodiment of the invention.
Figure 4:
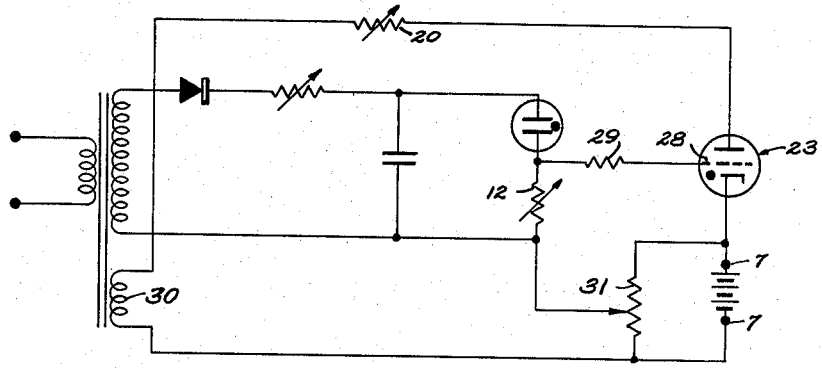
FIG. 4 is a circuit diagram illustrating a modified form of the embodiment of FIG. 2.

In a circuit of the type illustrated in FIG. 2, the grid bias for tube 23 can advantageously be derived from the batteries being charged, as seen in FIG. 4. Here, the anode and cathode of tube 23 are connected respectively to the terminals of a supplementary transformer secondary winding 30. The resistance 20 is connected in series with anode 22. A bleeder resistance 31 is connected across the connectors 7, the tap of resistance 31 being connected through resistances 12 and 29 to grid 28 of tube 23. The grid bias value is thus determined by the position of the tap of resistance 31 and by the number and size of the batteries being charged. Suitable calibrated manual adjusting means (not shown) is provided to position the tap of resistance 31 at selected points in accordance with the size and numer of the batteries.

Figure 5:
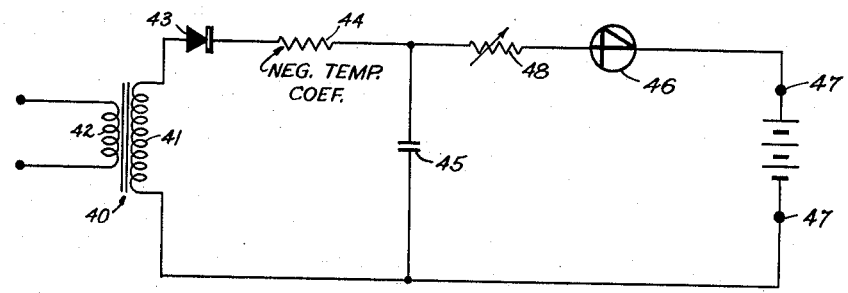
FIG. 5 is a circuit diagram illustrating a third embodiment of the invention.

It has been found that the self-discharge of a battery decreases as temperature decreases, and therefore the amount of charge maintaining current required decreases accordingly. If the temperature is as below 32° F., the self-discharge is so negligible that a charge maintainer is not needed. Accordingly, it is desirable to have a charge maintainer where the average value of the charging current decreases in accordance with decreases in temperature. A charge maintainer of this type is illustrated in FIG. 5.

As illustrated, this charge maintainer includes a transformer 40 having a secondary winding 41 and a primary winding 42 connected to a suitable source of alternating current (not shown). One end of secondary winding 41 is connected to the anode of a diode 43, the cathode of this diode being connected to the other end of secondary winding 41 via a negative temperature coefficient resistor 44 and a capacitor 45. The negative temperature coefficient resistor is of the type which increases in resistance value as the surrounding ambient temperature decreases. Secondary winding 41, diode 43 and resistor 44 form a charging circuit for capacitor 45. The rate at which capacitor 45 is charged is determined primarily by the resistance value of resistor 44. Because of the negative temperature coefficient of resistor 44, capacitor 45 charges more rapidly at higher surrounding ambient temperatures, and more slowly as the temperature decreases.

A four layer diode 46 is connected across capacitor 45. A four layer diode is a PNPN semiconductor device which is internally regenerative. Normally, this diode is non-conductive in both directions, but becomes conductive in the forward direction when the applied potential, positive at the anode, exceeds the predetermined breakdown voltage for the diode. Thereafter, the diode remains conductive until the current flow through the diode falls below a predetermined holding level.

The anode of four layer diode 46 is connected to the positive plate of capacitor 45 through a variable resistance 48, the positive plate of the capacitor being that which is connected to resistor 44. The cathode of four layer diode 46 is connected to one of a pair of connector clamps 47, the other connector clamp being connected to the negative plate of capacitor 45. The battery to be charged by the apparatus is connected between connector clamps 47 with a polarity as indicated in the drawing.

When the potential across capacitor 45 exceeds the breakdown voltage of four layer diode 46 plus the battery terminal voltage, the diode becomes conductive and the capacitor discharges, the discharge current flowing through resistor 48, diode 46 and the battery connected to connectors 47. When the capacitor becomes sufficiently discharged that the current flow through diode 46 falls below the holding level of the four layer diode, diode 46 regains its non-conductive state and current flow through the battery ceases. As soon as diode 46 again attains its non-conductive state, capacitor 45 begins to charge via diode 43 and resistor 44. When capacitor 45 has become sufficiently charged such that the potential across the capacitor exceeds the breakdown voltage of four layer diode 46, the diode again becomes conductive and discharges the capacitor. Thus, it is seen that these components form a relaxation oscillator which periodically provides pulse charges to the battery connected to connector clamps 47.

As has previously been explained, it is essential that the charging duty cycle be comparatively low. Preferably resistor 44 is of a comparatively high value so that a substantial time interval, in the order of minutes, is required to charge capacitor 45 up to the breakdown voltage of four layer diode 46. The impedance of the discharging circuit determines the length of time required to discharge capacitor 45, and therefore resistor 48 should be so adjusted that the required discharge time is substantially less than the capacitor charging time. Preferably, the charging duty cycle should be such that charging takes place less than one part in ten. It should be noted that the pulse magnitude applied to the battery connected at connectors 47 is substantially the same regardless of temperature. However, the charging time of capacitor 45 increases as temperature decreases and, therefore, these pulses are further spaced apart in time as temperature decreases. Accordingly, the average value of charging current applied to the batery decreases as the temperature decreases. Preferably, the resistance provided by resistor 44 becomes sufficiently high when the temperature approaches 32° F. that the charging time for capacitor 45 is extremely long and that, therefore, no effective charging of the battery takes place.

Figure 6:
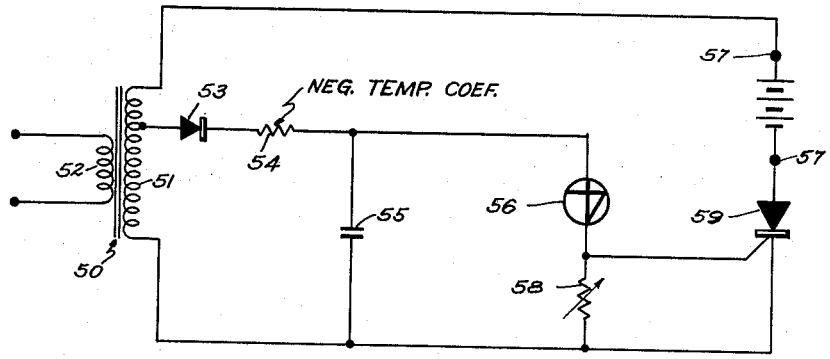
FIG. 6 is a circuit diagram illustrating a fourth embodiment of the invention.

Another embodiment of the invention is illustrated in FIG. 6. This embodiment is very similar to the embodiments illustrated in FIGS. 2 and 4 except that solid state elements are used in place of the gas-filled tubes. Also, a negative temperature coefficient resistance has been added in order to decrease the average value of charging current as temperature decreases.

More specifically, the apparatus illustrated in FIG. 6 includes a transformer 50 having a tapped secondary winding 51 and a primary winding 52 connected to a suitable source of alternating current (not shown). A relaxation oscillator circuit is connected between the top of secondary winding 51 and one end thereof. The relaxation oscillator includes a diode 53, a negative temperature coefficient resistor 54 and a capacitor 55 connected in series across the portion of the secondary winding. These components operate as a capacitor charging circuit in essentially the same manner as previously described with regard to components 43–45 in FIG. 5. The discharging circuit for capacitor 55 includes a four layer diode 56 connected in series with a variable resistor 58, this series combination being connected in parallel with capacitors 55. Capacitor 55 is discharged through resistor 58 whenever the potential across the capacitor exceeds the breakdown potential of four layer diode 56. A positive potential is developed at the junction between the four layer diode and resistor 58 which discharging current flows through resistor 58.

The cathode of a silicon controlled rectifier 59 is connected to one end of secondary winding 51, the anode of the controlled rectifier being connected to the other end of secondary winding 51 via connector clamps 57. The battery to be charged is connected to connector clamps 57 with the polarity as indicated in the drawing. The gate element of controlled rectifier 59 is connected to the junction between resistor 58 and four layer diode 56.

A silicon controlled rectifier is a four layer PNPN regenerative semiconductor. The operation of the controlled rectifier is similar to gas-filled thyratron tubes previously described. More specifically, when a positive potential is applied at the gate element, the controlled rectifier becomes conductive if the anode is positive with respect to the cathode, and thereafter remains conductive so long as a potential of this polarity is applied between the anode and the cathode. The controlled rectifier cannot initially become conductive unless a positive potential is applied to the gate element. Also, the controlled rectifier is never conductive if the cathode is positive with respect to the anode.

In explaining the operation of the circuit in FIG. 6, it is initially assumed that capacitor 55 is not charged. Therefore, the first phase of the operation occurs when the charging circuit is in operation building up a charge on capacitor 55. During this time, four layer diode 56 is non-conductive and therefore no positive potential is applied to the gate element of controlled rectifier 59. Thus, there is no current flow through the battery connected to connector clamps 57 and the controlled rectifier 59. Thereafter, when the potential across capacitor 55 exceeds the breakdown potential of four layer diode 56, the capacitor discharges and therefore a positive potential is applied to the gate element of controlled rectifier 59. So long as the discharge of capacitor 55 continues, the gate element of controlled rectifier 59 remains positive. Throughout this time interval, controlled rectifier 59 becomes conductive and permits charging current to flow through the battery connected to connector clamps 57 whenever the potential provided across the entire secondary winding 51 exceeds the battery terminal voltage, and is of the proper polarity for conduction of controlled rectifier 59.

In all of the previous embodiments, the relaxation oscillator for the charge maintainer was connected in the transformer secondary circuit. In some instances, however, it may be desirable to connect the relaxation oscillator circuit in the transformer primary circuit since this reduces the required current handling capacity. This is quite feasible since relaxation oscillator circuits can more easily be designed to handle high voltages than they can to handle high currents. This is particularly so with regard to the neon tube discharge devices. The disadvantage, however, is that the capacitor required is much larger, and therefore the location of the oscillator circuit becomes an engineering choice.

Figure 7:
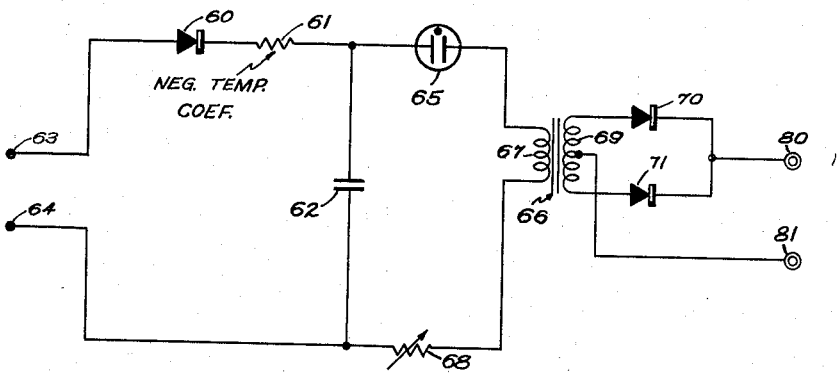
FIG. 7 is a circuit diagram illustrating a fifth embodiment of the invention.

The circuit with the relaxation oscillator in the transformer primary is illustrated schematically in FIG. 7. The capacitor charging circuit includes a capacitor 62 connected in series with a negative temperature coefficient resistor 61 and a diode 60 between terminals 63 and 64. Terminals 63 and 64 are connected to a suitable source of alternating current (not shown). The capacitor charging circuit operates similar to those previously described in FIGS. 5 and 6 such that the ambient temperature surrounding resistor 61 determines the capacitor charging rate.

The capacitor discharging circuit includes a neon tube 65 connected in series with a primary winding 67 of a transformer 66 and a variable resistor 68, this series combination being connected in parallel with capacitor 62. The capacitor is discharged through this discharge circuit whenever the potential across the capacitor exceeds the breakdown potential of neon tube 65. The time required for capacitor 62 to discharge is determined by the impedance provided by resistor 68.

Transformer 66 also includes a center tap secondary winding 69. The anodes of diodes 70 and 71 are connected respectively to the ends of the secondary winding, the cathodes of these diodes being connected together and to a connector clamp 80. A second connector clamp 81 is connected directly to the center tap of secondary winding 59. A battery to be charged is connected between the connector clamps with the positive terminal of the battery being connected to connector clamp 80.

In operation, capacitor 60 charges at a rate determined by the ambient temperature surrounding resistor 61. When capacitor 62 becomes sufficiently charged that the potential across the capacitor exceeds the breakdown potential on neon tube 65, the neon tube becomes conductive. Conduction of neon tube 65 causes a pulse of discharge current to flow through primary winding 67. This pulse of discharge current results in a current pulse developed by secondary winding 69, this current pulse being more substantial because of the turns ratio of transformer 66. Diodes 70 and 71 rectify the current pulse so that only the portion of the proper polarity passes through the battery connected to clamps 80 and 81. Resistor 68 and resistor 61 should be so selected that the charging duty cycle is relatively low, preferably less than 1 part in 10. Accordingly, the time required to discharge capacitor 62, as is primarily determined by the resistance value of resistor 68, should be relatively short compared to the time required to charge capacitor 62 as is determined primarily by the resistance value of resistor 61.

While several illustrative embodiments of the present invention have been illustrated in detail, it should be obvious to those skilled in the art that numerous embodiments could be conceived without departing from the scope of this invention. The invention is more particularly defined in the appended claims.

What is claimed is:
1. In a battery charge maintainer, the combination of
a charging circuit including connector means for connection to at least one battery to be charged,
electrical relay means connected in said charging circuit in series with said connector means and including a control element.
a first resistance and a breakdown device connected in series and means connecting the junction point between said resistance and discharge device to the control element of said relay means,
a condenser connected across the series combination of said first resistance and breakdown device to form a parallel circuit, a second resistance, and direct current circuit means connecting said second resistance in series with said parallel circuit, the combination of said breakdown device, condenser and second resistance constituting a relaxation oscillator, and said relay means being operable to supply charging current pulses via said charging circuit timed in accordance with operation of said oscillator.

2. A battery charge maintainer in accordance with claim 1 and wherein said second resistance is adjustable.

3. A battery charge maintainer in accordance with claim 2 and wherein said first resistance is adjustable.

4. A battery charge maintainer in accordance with claim 1 wherein said relay means is a grid controlled discharge tube having its control grid connected to said junction and wherein said breakdown device is a two element gas-filled discharge tube.

5. A battery charge maintainer in accordance with claim 1 wherein said electrical relay means is a silicon controlled rectifier having a gate element connected to said junction and wherein said breakdown device is a four layer diode.

6. A battery charge maintainer in accordance with claim 1, wherein the values of said first and second resistances are such that the time during which charging does not take place is at least ten times as great as the battery charging time.

7. A battery charge maintainer in accordance with claim 1, wherein the values of said first and second resistances are such that the relationship between the applied charging potential and the battery charging duty cycle causes the average battery terminal voltage to approximately coincide with the terminal voltage value which causes minimum battery plate corrosion.

8. A battery charge maintainer in accordance with claim 1, wherein said first resistance is a negative temperature coefficient resistance operative to decrease the capacitor charge rate as the ambient temperature decreases.

9. A battery charge maintainer in accordance with claim 1 and further comprising a bias circuit connected across said connector means and having an output terminal connected to said control element of said relay means, said bias circuit being operative to derive a bias voltage from a battery to be charged when the battery is connected to said connector means during operation of the maintainer.

10. The battery charge maintainer in accordance with claim 1 wherein said discharge device is a regenerative semiconductor, and said electrical relay means is a semiconductor the conductive state of which can be controlled by current flow through a gate element thereof, said oscillator being connected to the gate element.

References Cited by the Examiner
UNITED STATES PATENTS 2,333,224  11/1943  Agnew _____ 331—129 X
2,826,693  3/1958  Resnik _____ 331—129 X
2,852,729  9/1958  Kern _____ 331—129

OTHER REFERENCES

Harvey, R. A.: Battery Chargers and Charging, London (1953), QC 603 H 25, pages 58 and 59.

LLOYD McCOLLUM, Examiner.

MILTON O. HIRSHFIELD, Primary Examiner.